(12) United States Patent
Merriman et al.

(10) Patent No.: US 8,974,934 B2
(45) Date of Patent: Mar. 10, 2015

(54) BATTERY MODULE

(75) Inventors: Robert Merriman, Shelby Township, MI (US); Thomas J. Gadawski, Shelby Township, MI (US); Josh Payne, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 31 days.

(21) Appl. No.: 13/587,102

(22) Filed: Aug. 16, 2012

(65) Prior Publication Data
US 2014/0050952 A1   Feb. 20, 2014

(51) Int. Cl.
*H01M 10/50* (2006.01)

(52) U.S. Cl.
USPC .............. 429/72; 429/71; 429/88; 429/120; 165/159; 165/158; 165/157; 165/76; 165/174; 285/321; 285/345; 285/347; 285/196; 285/213; 285/215

(58) Field of Classification Search
CPC ........................... H01M 10/50; H01M 10/5057
USPC ........ 429/71, 72, 88, 120; 165/159, 158, 157, 165/76, 174; 285/321, 345, 347, 196, 213, 285/215
See application file for complete search history.

(56) References Cited

U.S. PATENT DOCUMENTS

| | | | |
|---|---|---|---|
| 1,806,364 A | 5/1931 | Newman | |
| 2,814,404 A | 11/1957 | Towns | |
| 3,394,836 A | 7/1968 | Millard | |
| 3,588,149 A | 6/1971 | Demler et al. | |
| 3,750,744 A * | 8/1973 | Bouras | 165/76 |
| 4,009,720 A | 3/1977 | Crandall | |
| 4,706,737 A | 11/1987 | Taylor et al. | |
| 5,071,020 A | 12/1991 | Reutter | |
| 5,123,677 A | 6/1992 | Kreczko et al. | |
| 5,228,724 A | 7/1993 | Godeau | |
| 5,330,235 A | 7/1994 | Wagner et al. | |
| 5,873,610 A | 2/1999 | Szabo | |
| 5,882,047 A | 3/1999 | Ostrander et al. | |
| 5,921,467 A * | 7/1999 | Larson | 165/46 |

(Continued)

FOREIGN PATENT DOCUMENTS

| | | |
|---|---|---|
| JP | 2001167803 A | 6/2001 |
| JP | 2004006089 A | 1/2004 |

(Continued)

OTHER PUBLICATIONS

International Search Report for International Application No. PCT/KR2011/005821 dated Feb. 10, 2012.

(Continued)

*Primary Examiner* — Milton I Cano
*Assistant Examiner* — Ling R Zeng
(74) *Attorney, Agent, or Firm* — Buckert Patent & Trademark Law Firm, PC; John F. Buckert

(57) ABSTRACT

A battery module is provided. The battery module includes a battery cell and a heat exchanger disposed adjacent to the battery cell. The battery module further includes a cooling manifold having a tubular wall, a first fluid port, and a ring shaped member. The tubular wall defines an interior region and having first and second end portions. The first fluid port extends outwardly from an outer surface of the tubular wall and fluidly communicates with the interior region of the tubular wall. The ring shaped member is disposed on an outer surface of the first fluid port a predetermined distance from the outer surface of the tubular wall.

22 Claims, 16 Drawing Sheets

(56) References Cited

U.S. PATENT DOCUMENTS

| | | |
|---|---|---|
| 6,182,694 B1 | 2/2001 | Sievers et al. |
| 6,257,417 B1 | 7/2001 | Szumera |
| 6,279,600 B1 | 8/2001 | Robinson |
| 6,295,980 B1 | 10/2001 | Lopez et al. |
| 6,371,319 B2 | 4/2002 | Yeaton et al. |
| 6,481,759 B1 | 11/2002 | Kawasaki et al. |
| 6,501,036 B2 | 12/2002 | Rochon et al. |
| 6,505,866 B1 | 1/2003 | Nakamura et al. |
| 6,666,263 B2 | 12/2003 | Luz et al. |
| 6,688,654 B2 | 2/2004 | Romero |
| 6,926,174 B1 | 8/2005 | Heldt |
| 7,857,359 B2 | 12/2010 | Zeitlinger et al. |
| 7,878,553 B2 | 2/2011 | Wicks et al. |
| 2004/0232696 A1 | 11/2004 | Andre |
| 2007/0087266 A1 | 4/2007 | Bourke et al. |
| 2008/0299446 A1* | 12/2008 | Kelly ............................. 429/71 |
| 2008/0311468 A1* | 12/2008 | Hermann et al. ............ 429/120 |
| 2009/0325051 A1* | 12/2009 | Niedzwiecki et al. ........ 429/120 |
| 2010/0102552 A1* | 4/2010 | Lockhart et al. .............. 285/256 |
| 2012/0042977 A1 | 2/2012 | Gadawski |
| 2012/0043754 A1 | 2/2012 | Gadawski |
| 2012/0045683 A1 | 2/2012 | Gadawski |

FOREIGN PATENT DOCUMENTS

| | | |
|---|---|---|
| JP | 2004288527 A | 10/2004 |
| JP | 2005518645 A | 6/2005 |
| JP | 2006032037 A | 2/2006 |
| JP | 2006210245 A | 8/2006 |
| KR | 20100003139 A | 1/2010 |

OTHER PUBLICATIONS

International Search Report for International Application No. PCT/KR2011/005823 dated Mar. 22, 2012.

International Search Report for International Patent Application No. PCT/KR2011/005822 dated Mar. 22, 2012.

* cited by examiner

BATTERY MODULE

BACKGROUND

The inventors herein have recognized a need for an improved battery module with a cooling manifold having improved fluid port sealing characteristics.

SUMMARY

A battery module in accordance with an exemplary embodiment is provided. The battery module includes a battery cell and a heat exchanger disposed adjacent to the battery cell. The battery module further includes a cooling manifold having a tubular wall, a first fluid port, and a ring shaped member. The tubular wall defines an interior region and having first and second end portions. The first fluid port extends outwardly from an outer surface of the tubular wall and fluidly communicates with the interior region. The first fluid port extends through the tubular wall and is integrally attached to the tubular wall. The ring shaped member is disposed on an outer surface of the first fluid port a predetermined distance from the outer surface of the tubular wall. The ring shaped member is constructed of a rigid material that prevents the first fluid port from expanding radially outwardly when a tube from the heat exchanger is inserted into the first fluid port.

A battery module in accordance with another exemplary embodiment is provided. The battery module includes a battery cell and a heat exchanger disposed adjacent to the battery cell. The battery module further includes a cooling manifold having a tubular wall, a first fluid port and a split-ring shaped member. The tubular wall defining an interior region and having first and second end portions. The first fluid port extends outwardly from an outer surface of the tubular wall and fluidly communicates with the interior region. The first fluid port extends through the tubular wall and is integrally attached to the tubular wall. The split-ring shaped member is disposed on an outer surface of the first fluid port a predetermined distance from the outer surface of the tubular wall. The split-ring shaped member is constructed of a rigid material that prevents the first fluid port from expanding radially outwardly when a tube from the heat exchanger is inserted into the first fluid port.

DETAILED DESCRIPTION

Figure 1:
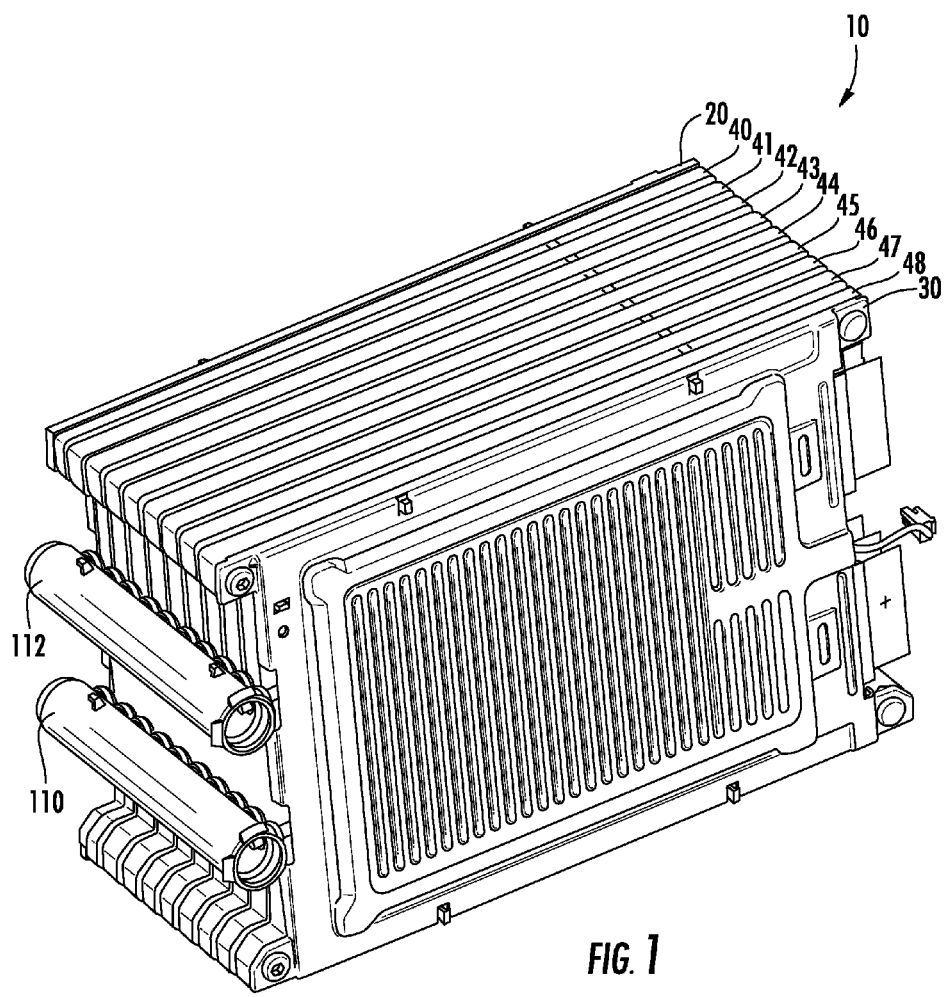
FIG. 1 is a schematic of the battery module in accordance with an exemplary embodiment.

Referring to FIGS. 1-5, a battery module 10 for providing electrical power is provided. The battery module 10 includes end plates 20, 30, frame members 40, 41, 42, 43, 44, 45, 46, 47, 48, heat exchangers 60, 62, 64, 66, 68, 70, 72, 74, 76, 78, battery cells 80, 82, 84, 86, 88, 90, 92, 94, 96, 97, 98, 99, 100, 101, 102, 103, 104, 105, 106, 107 and cooling manifolds 110, 112. An advantage of the cooling manifolds 110, 112 is that the cooling manifolds utilize ring-shaped members constructed of a rigid material that are disposed on each fluid port to prevent the fluid port from expanding radially outwardly when a tube from a heat exchanger is inserted into the fluid port.

The end plates 20, 30 are disposed on opposite sides of the battery module 10 and the frame members, the heat exchangers, and the battery cells are disposed between the end plates 20, 30.

Figure 14:
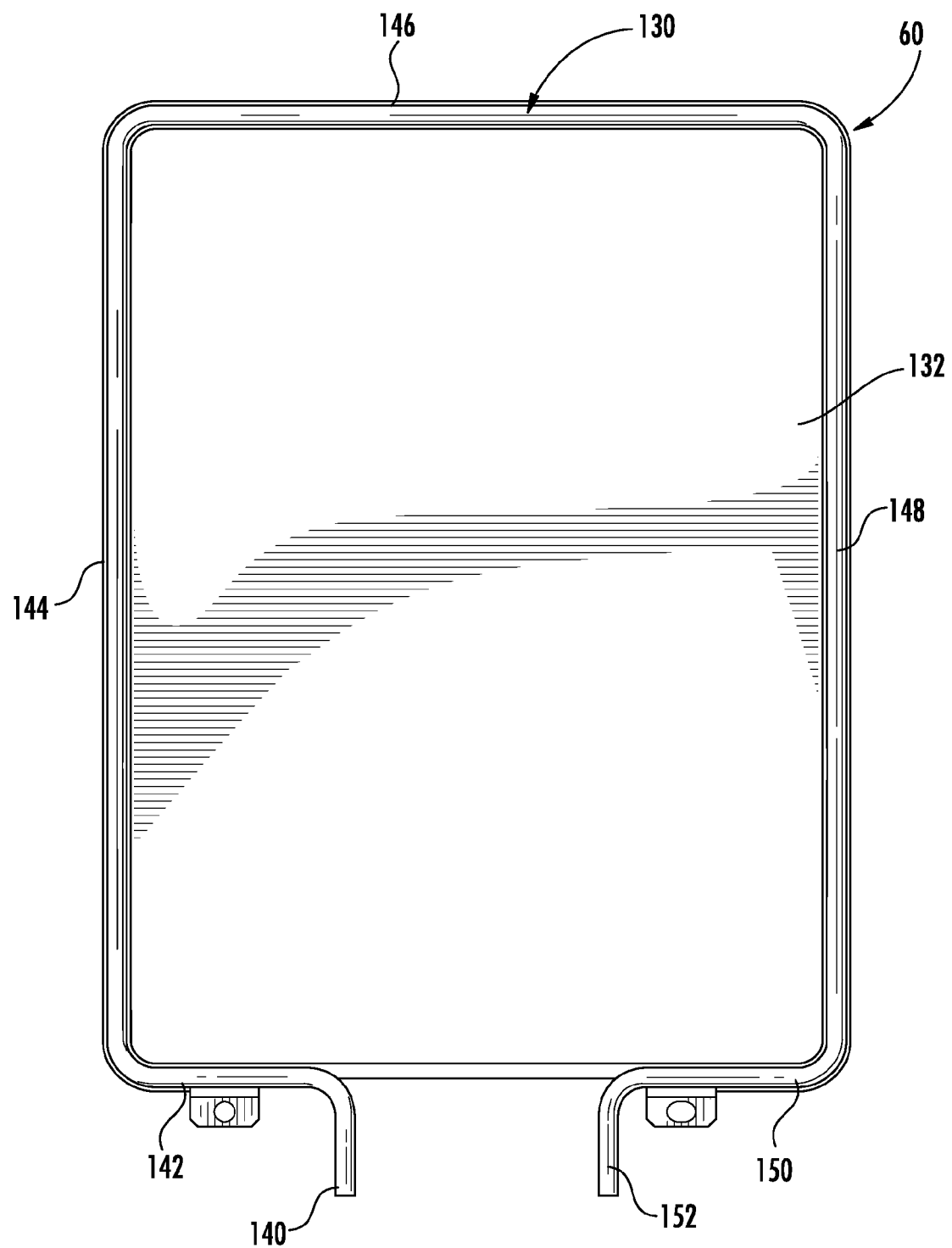
FIG. 14 is a schematic of a heat exchanger coupled to the cooling manifold of FIG. 6.

Referring to FIGS. 1, 2, 3 and 14, the heat exchangers 60, 62, 64, 66, 68, 70, 72, 74, 76, 78 are configured to receive a fluid from the cooling manifold 110 that flows through the heat exchangers to cool the battery cells 80, 82, 84, 86, 88, 90, 92, 94, 96, 97, 98, 99, 100, 101, 102, 103, 104, 105, 106, 107. The cooling manifold 112 is configured to receive the fluid from the heat exchangers 60-78. The heat exchangers 60-78 have an identical structure with one another. Accordingly, only the structure of the heat exchanger 60 will be described in greater detail hereinafter. Referring to FIG. 14, the heat exchanger 60 includes a tube 130 that is coupled to a peripheral portion of a rectangular shaped plate 132. The tube 130 includes tube portions 140, 142, 144, 146, 148, 150, 152 that fluidly communicate with one another. The tube portions 142, 144, 146, 148 are coupled to the peripheral portion of the rectangular shaped plate 132. The tube portions 140, 152 are configured to be received within first and second fluid ports of the cooling manifolds 110, 112, respectively.

Figure 2:
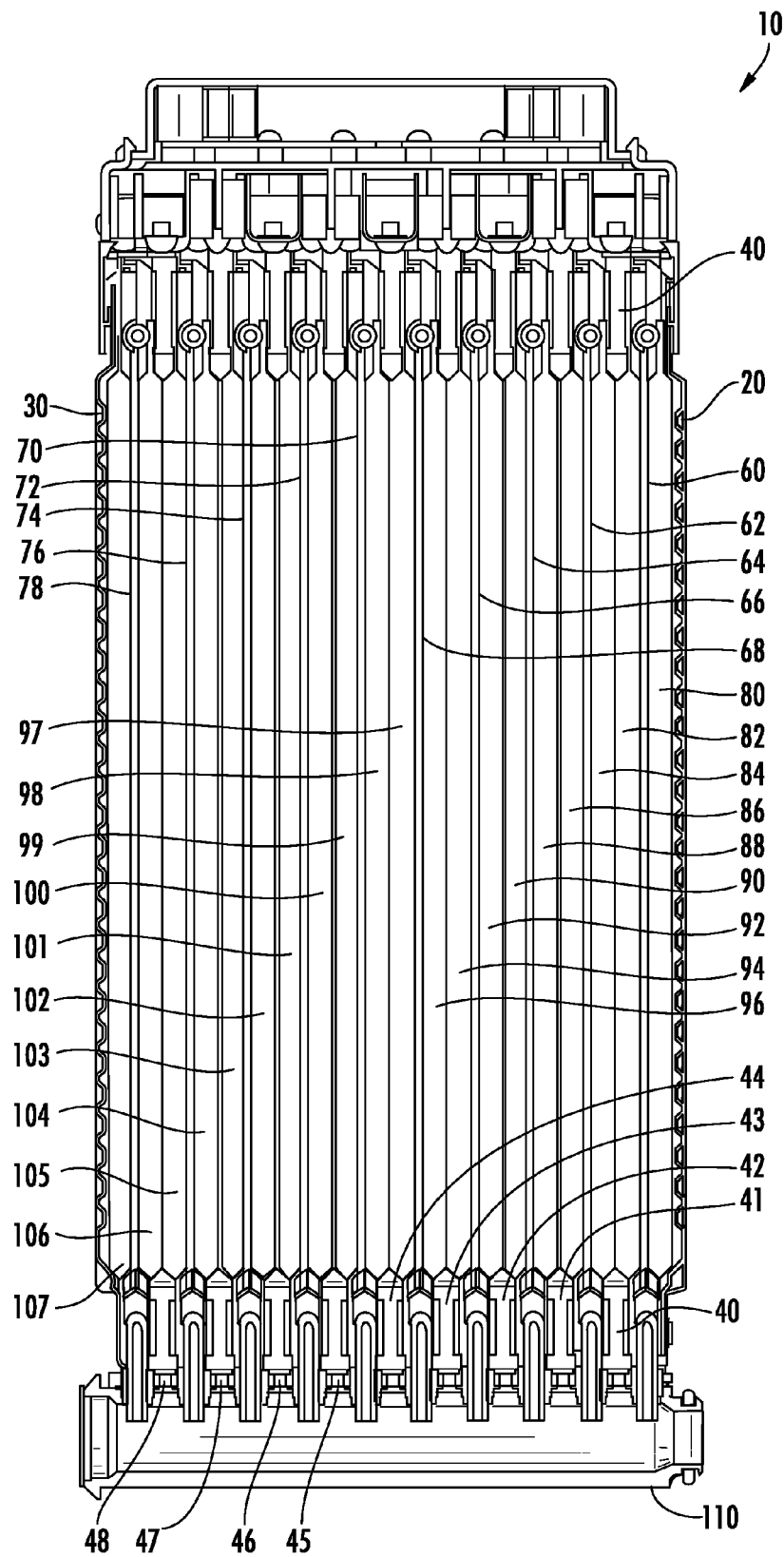
FIG. 2 is a cross-sectional schematic of the battery module of FIG. 1.
Figure 3:
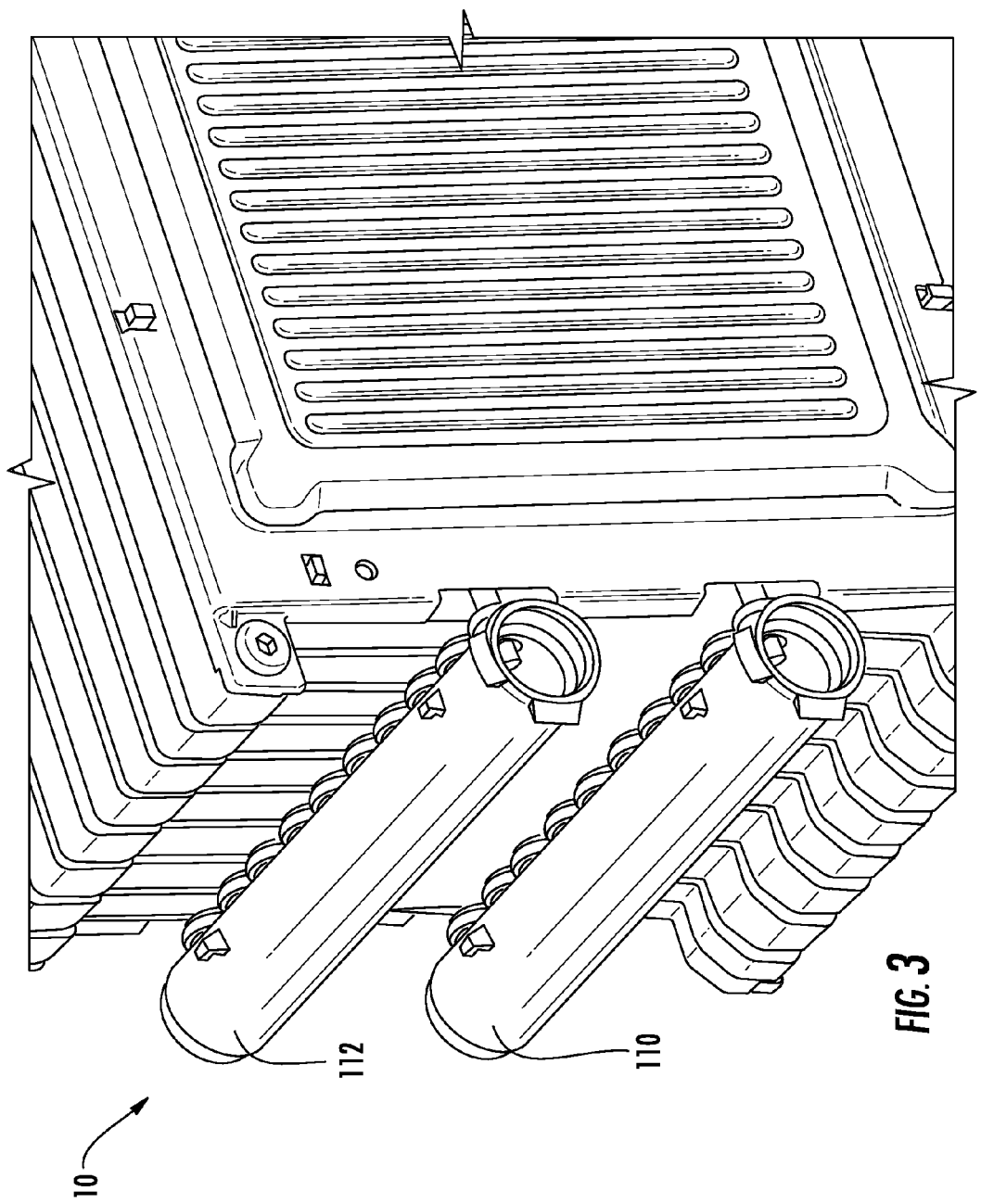
FIG. 3 is an enlarged schematic of a portion of the battery module of FIG. 2 illustrating first and second cooling manifolds.
Figure 4:
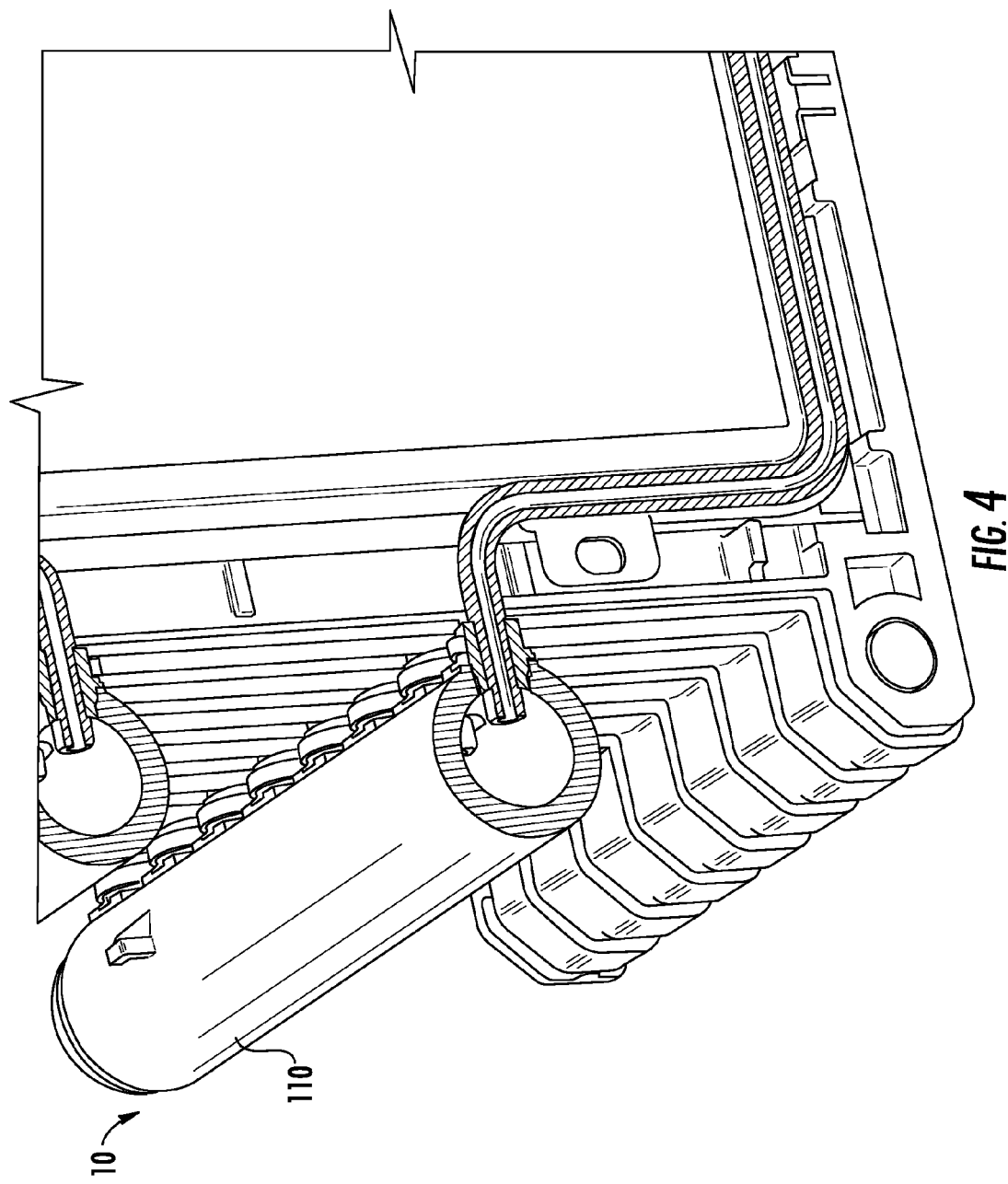
FIG. 4 is an enlarged schematic of a portion of the battery module of FIG. 3 illustrating the first cooling manifold.
Figure 5:
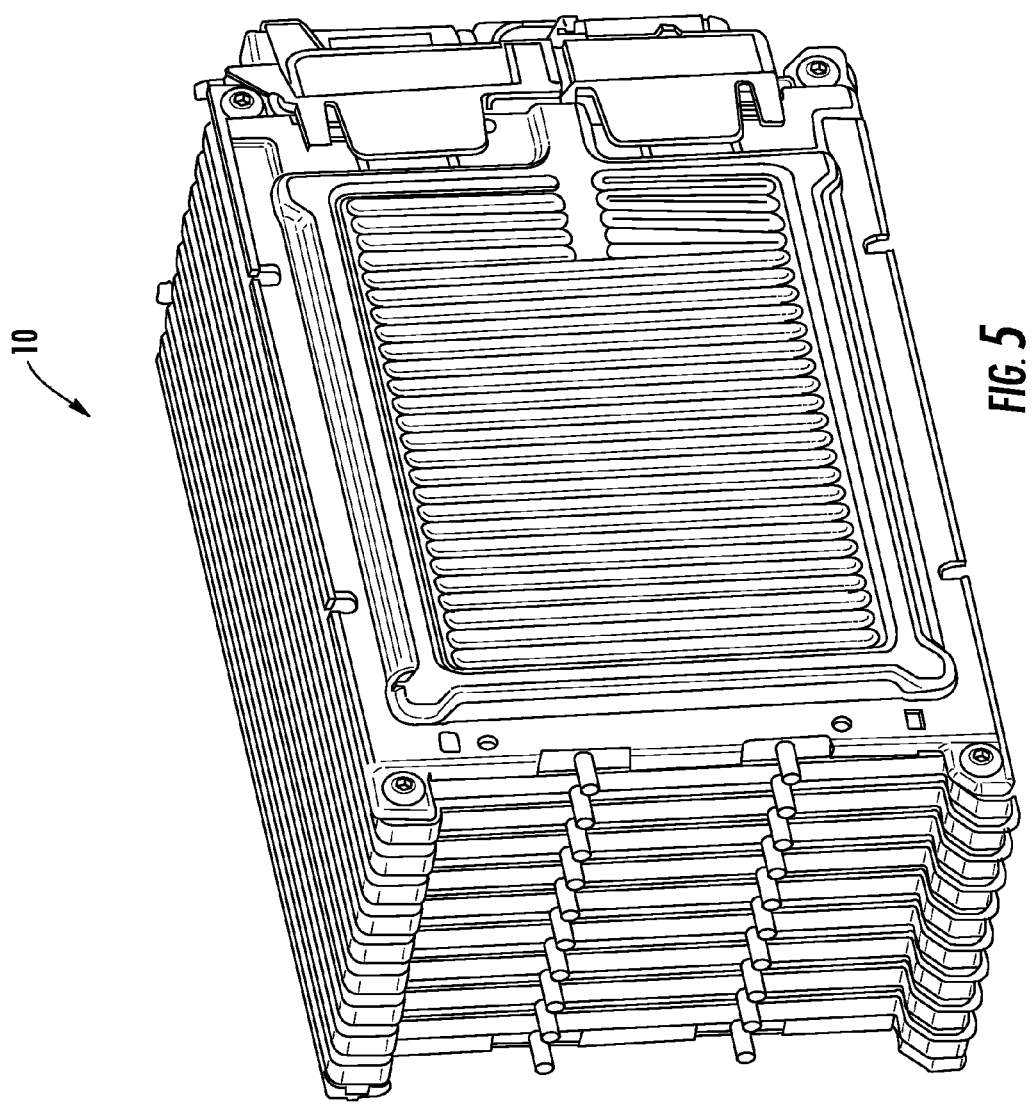
FIG. 5 is a schematic of a portion of the battery module of FIG. 1 with first and second cooling manifolds removed.

Referring to FIG. 2, the battery cells 80, 82, 84, 86, 88, 90, 92, 94, 96, 97, 98, 99, 100, 101, 102, 103, 104, 105, 106, 107 are electrically coupled together in series with one another. In one exemplary embodiment, the battery cells 80-107 are rectangular-shaped lithium-ion battery cells. Of course, in alternate embodiments, other types of battery cells known to those skilled in the art could be utilized.

The frame members 40, 41, 42, 43, 44, 45, 46, 47, 48 are configured to hold battery cells and the heat exchangers therebetween. The frame member 40 and the end plate 20 are configured to hold the battery cells 80, 82 and the heat exchanger 60 therebetween. The heat exchanger 60 is disposed between the battery cells 80, 82 to extract heat energy from the battery cells 80, 82.

The frame members 40, 41 are configured to hold the battery cells 84, 86 and the heat exchanger 62 therebetween. The heat exchanger 62 is disposed between the battery cells 84, 86 to extract heat energy from the battery cells 84, 86.

The frame members 41, 42 are configured to hold the battery cells 88, 90 and the heat exchanger 64 therebetween. The heat exchanger 64 is disposed between the battery cells 88, 90 to extract heat energy from the battery cells 88, 90.

The frame members 42, 43 are configured to hold the battery cells 92, 94 and the heat exchanger 66 therebetween. The heat exchanger 66 is disposed between the battery cells 92, 94 to extract heat energy from the battery cells 92, 94.

The frame members 43, 44 are configured to hold the battery cells 96, 97 and the heat exchanger 68 therebetween. The heat exchanger 68 is disposed between the battery cells 96, 97 to extract heat energy from the battery cells 96, 97.

The frame members 44, 45 are configured to hold the battery cells 98, 99 and the heat exchanger 70 therebetween. The heat exchanger 70 is disposed between the battery cells 98, 99 to extract heat energy from the battery cells 98, 99.

The frame members 45, 46 are configured to hold the battery cells 100, 101 and the heat exchanger 72 therebetween. The heat exchanger 72 is disposed between the battery cells 100, 101 to extract heat energy from the battery cells 100, 101.

The frame members 46, 47 are configured to hold the battery cells 102, 103 and the heat exchanger 74 therebetween. The heat exchanger 74 is disposed between the battery cells 102, 103 to extract heat energy from the battery cells 102, 103.

The frame members 47, 48 are configured to hold the battery cells 104, 105 and the heat exchanger 76 therebetween. The heat exchanger 76 is disposed between the battery cells 104, 105 to extract heat energy from the battery cells 104, 105.

The frame member 48 and the end plate 30 are configured to hold the battery cells 106, 107 and the heat exchanger 78 therebetween. The heat exchanger 78 is disposed between the battery cells 106, 107 to extract heat energy from the battery cells 106, 107.

Referring to FIGS. 1, 2 and 6-13, the cooling manifold 110 is configured to receive a fluid from a fluid cooling system (not shown) through an aperture in the first end portion 380. The fluid flows into the interior region 390 and then through the fluid ports 220-238 into the heat exchangers 60-78. The heat exchangers 60-78 extract heat energy from the battery cells 80-107 and transfer the heat energy into the fluid flowing therethrough. Thereafter, fluid flows from the heat exchangers 60-78 and through the fluid ports of the cooling manifold 112 into the cooling manifold 112. From the cooling manifold 112, the fluid flows into the fluid cooling system (not shown) which cools the fluid. Since the cooling manifold 110 has an identical structure as the cooling manifold 112, only the structure of the cooling manifold 110 will be explained in greater detail below.

Referring to FIGS. 6-10 and 16, the cooling manifold 110 is configured to receive a fluid from a fluid system (not shown) and to route the fluid into the heat exchangers 60-78. The cooling manifold 110 includes a tubular wall 200, mounting tabs 200, 203, 204, 205, an end cap 210, fluid ports 220, 222, 224, 226, 228, 230, 232, 234, 236, 238, ring shaped members 320, 322, 324, 326, 328, 330, 332, 334, 336, 338 and a sealing gasket 350.

The tubular wall 200 has a first end portion 380 and a second end portion 382. The tubular wall 200 further defines an interior region 390 that fluidly communicates with apertures in each of the fluid ports 220-238. In one exemplary embodiment, the tubular wall 200 is constructed of plastic. Of course, in alternate embodiments, the tubular wall 200 could be constructed of other materials known to those skilled in the art.

The mounting tabs 200, 203, 204, 205 are integrally formed on an outer surface of the tubular wall 200 at the second end portion 382 of the tubular wall 200. The mounting tabs 200-205 are configured to be coupled to the end cap 210 which is disposed on the second end portion 382 to enclose the second end portion 382. In one exemplary embodiment, the mounting tabs 200-205 and the end cap 210 are constructed of plastic, and the end cap 210 is ultrasonically welded to the mounting tabs 200-205.

The fluid ports 220-238 extend outwardly from the outer surface 392 of the tubular wall 200 and fluidly communicate with the interior region 390 defined by the tubular wall 200. The fluid ports 220-238 are disposed linearly along the outer surface 392 and are spaced apart from one another. Because the fluid ports 220-238 have an identical structure to one another, only the structure of the fluid port 220 will be discussed in greater detail below.

Figure 11:
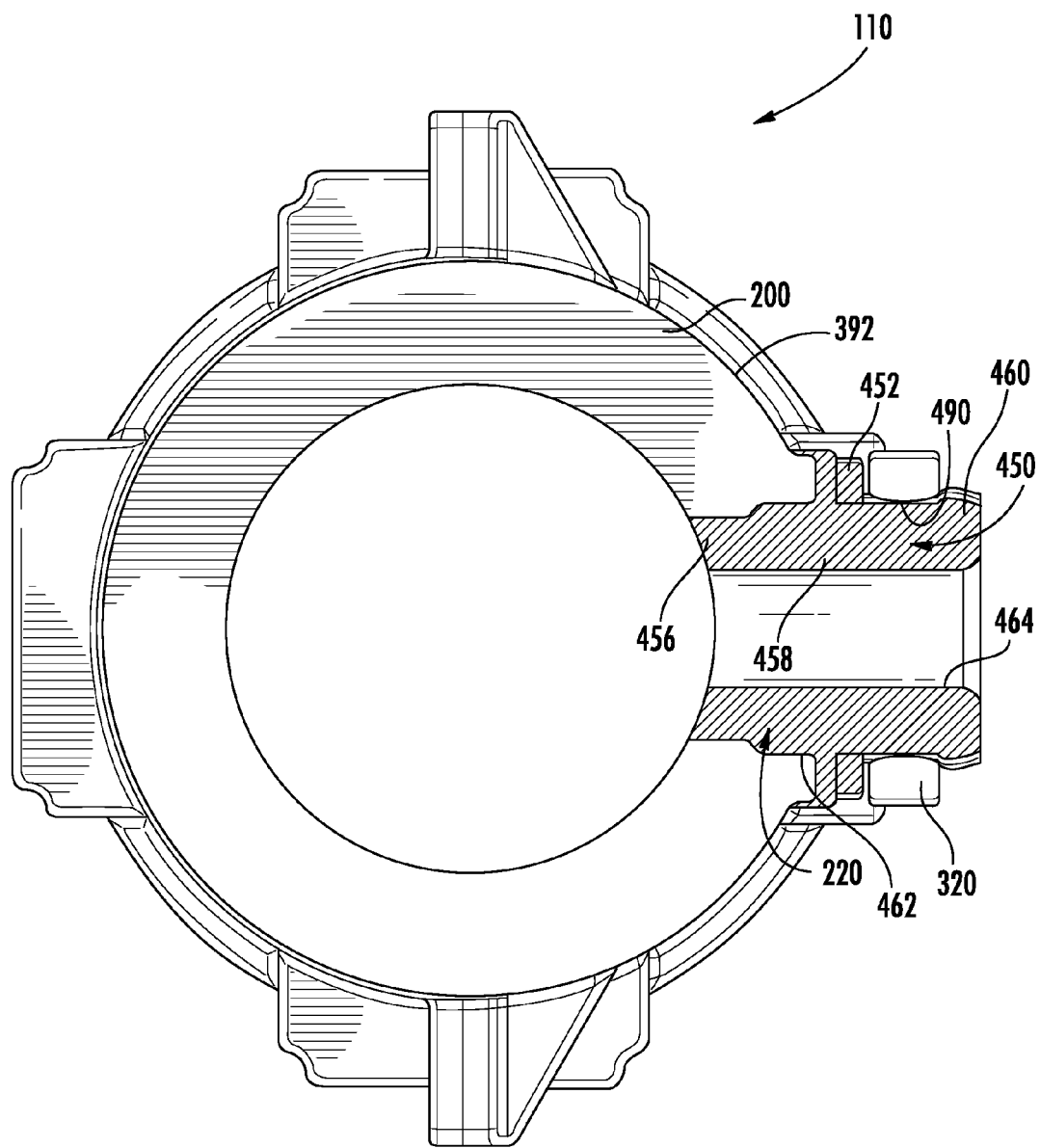
FIG. 11 is a cross-sectional schematic of the cooling manifold of FIG. 6.

Referring to FIG. 11, the fluid port 220 has a tubular port body 450 and a ring shaped seating portion 452. The tubular body portion 450 includes a coupling body portion 456, the central body portion 458, and an outer lip portion 460. The coupling body portion 456 extends through the tubular wall 200 of the cooling manifold 110 and is integrally attached to the tubular wall 200. The central body portion 458 extends from the coupling body portion 456 and is further coupled to the outer lip portion 460. The tubular port body 450 further includes an outer surface 462 and an aperture 464 that extends through the tubular port body 450. In particular, the aperture 464 extends through the coupling body portion 456, the central body portion 458, and the outer lip portion 460. The central body portion 458 defines a groove 490 thereon. The ring shaped seating portion 452 extends outwardly from the central body portion 458 and extends around an outer periphery of the central body portion 458. In one exemplary embodiment, the tubular port body 450 and the ring shaped seating portion 452 are constructed of an elastomeric material such as a thermoplastic elastomer for example. Of course, in alternative embodiments, other elastomeric materials could be utilized to construct the tubular port body 450 and the ring shaped seating portion 452 or portion thereof.

Figure 6:
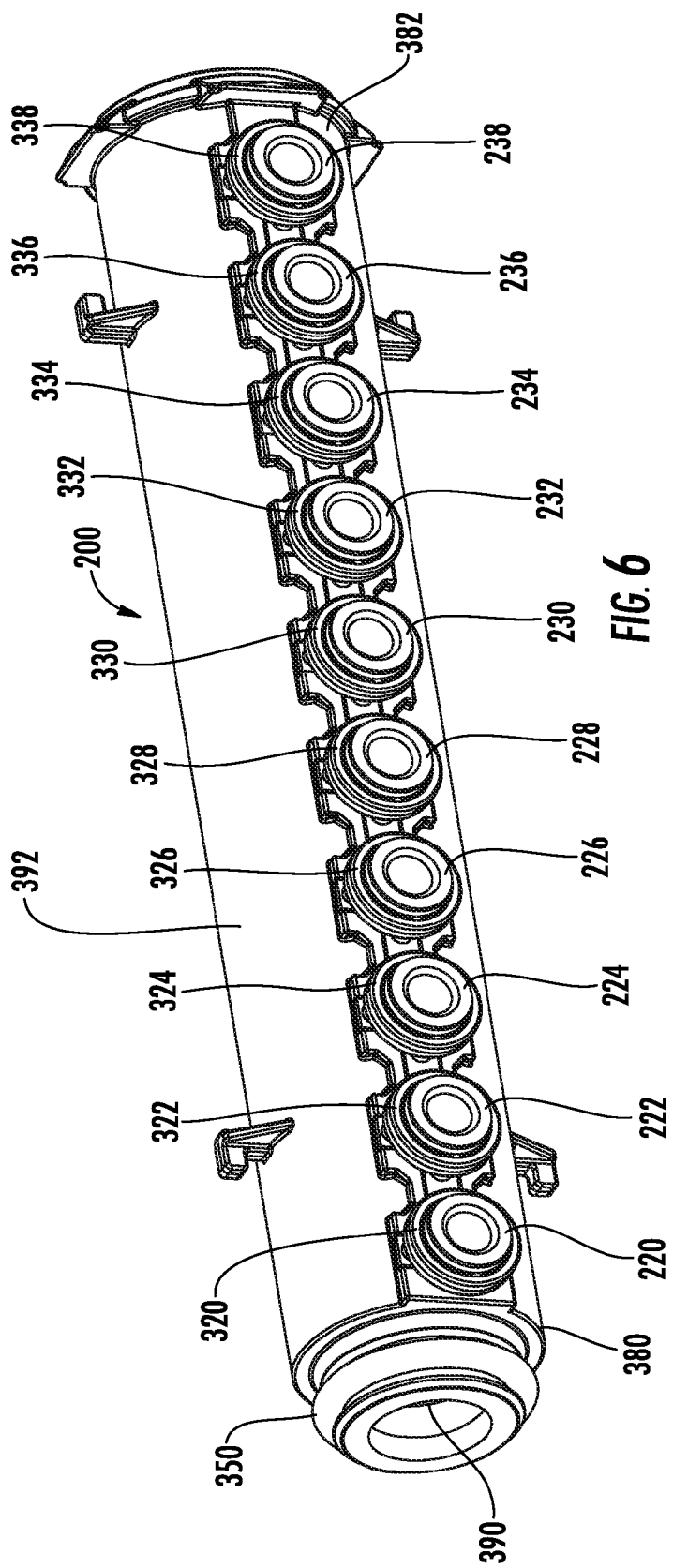
FIG. 6 is a schematic of a cooling manifold utilized in the battery module of FIG. 1.
Figure 7:
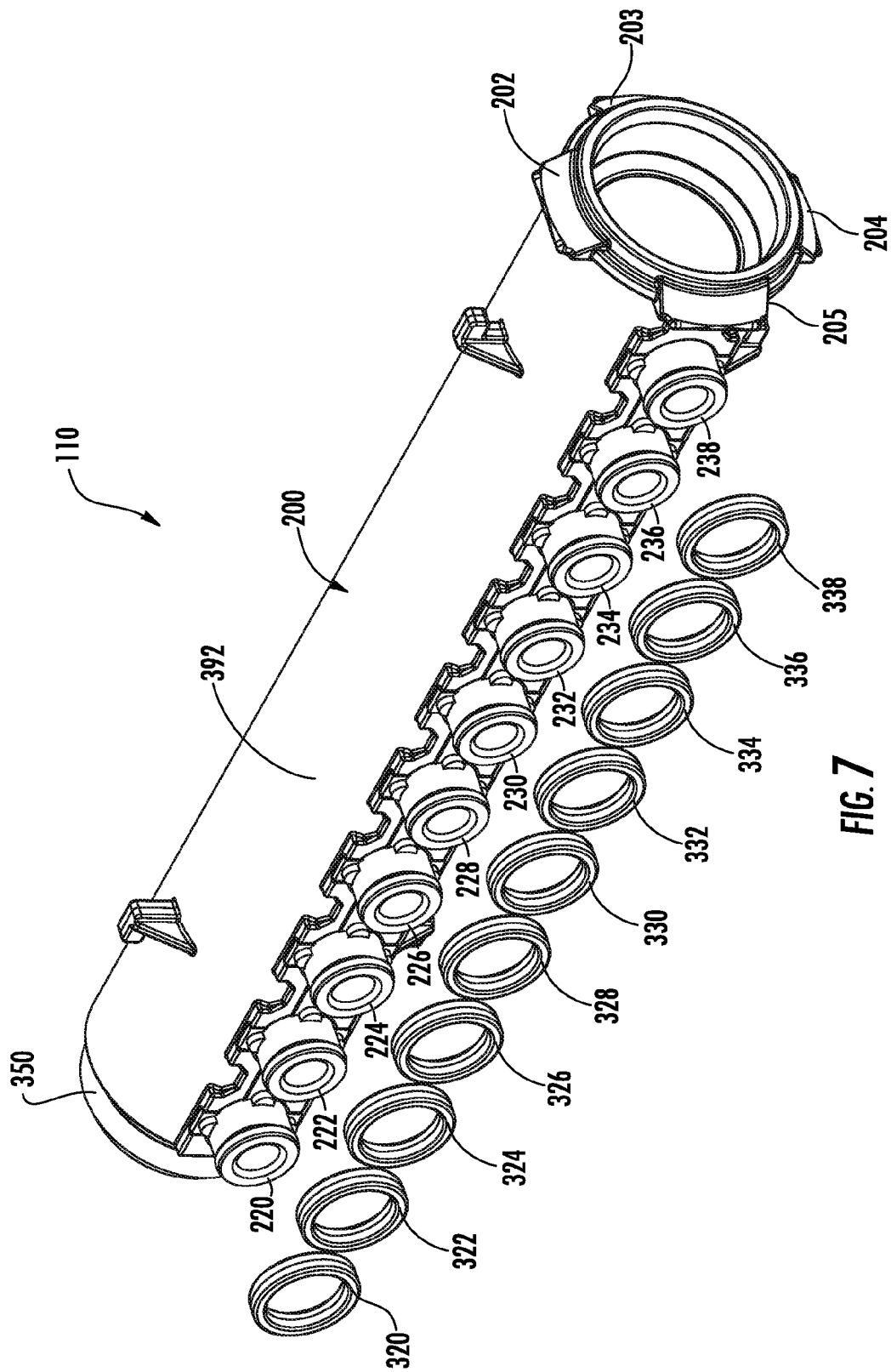
FIG. 7 is an exploded schematic of the cooling manifold of FIG. 6.
Figure 8:
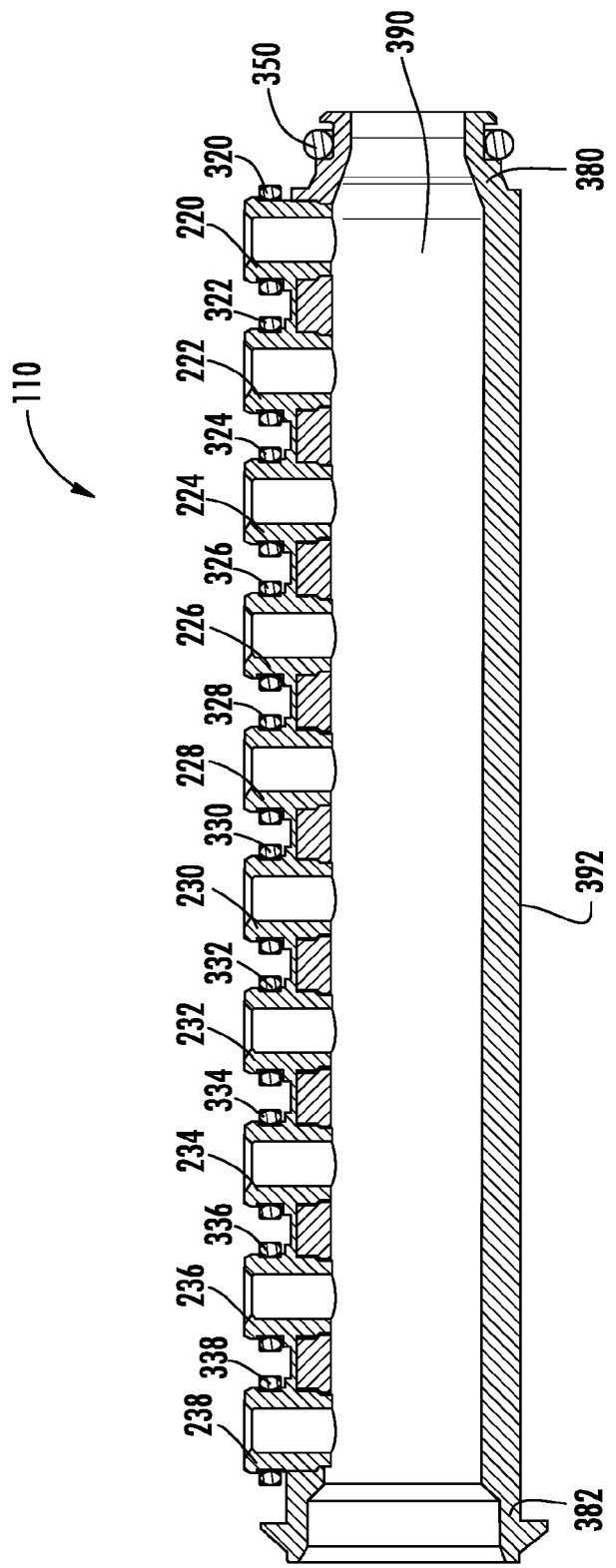
FIG. 8 is a cross-sectional schematic of the cooling manifold of FIG. 6 taken along a longitudinal axis of the cooling manifold.
Figure 9:
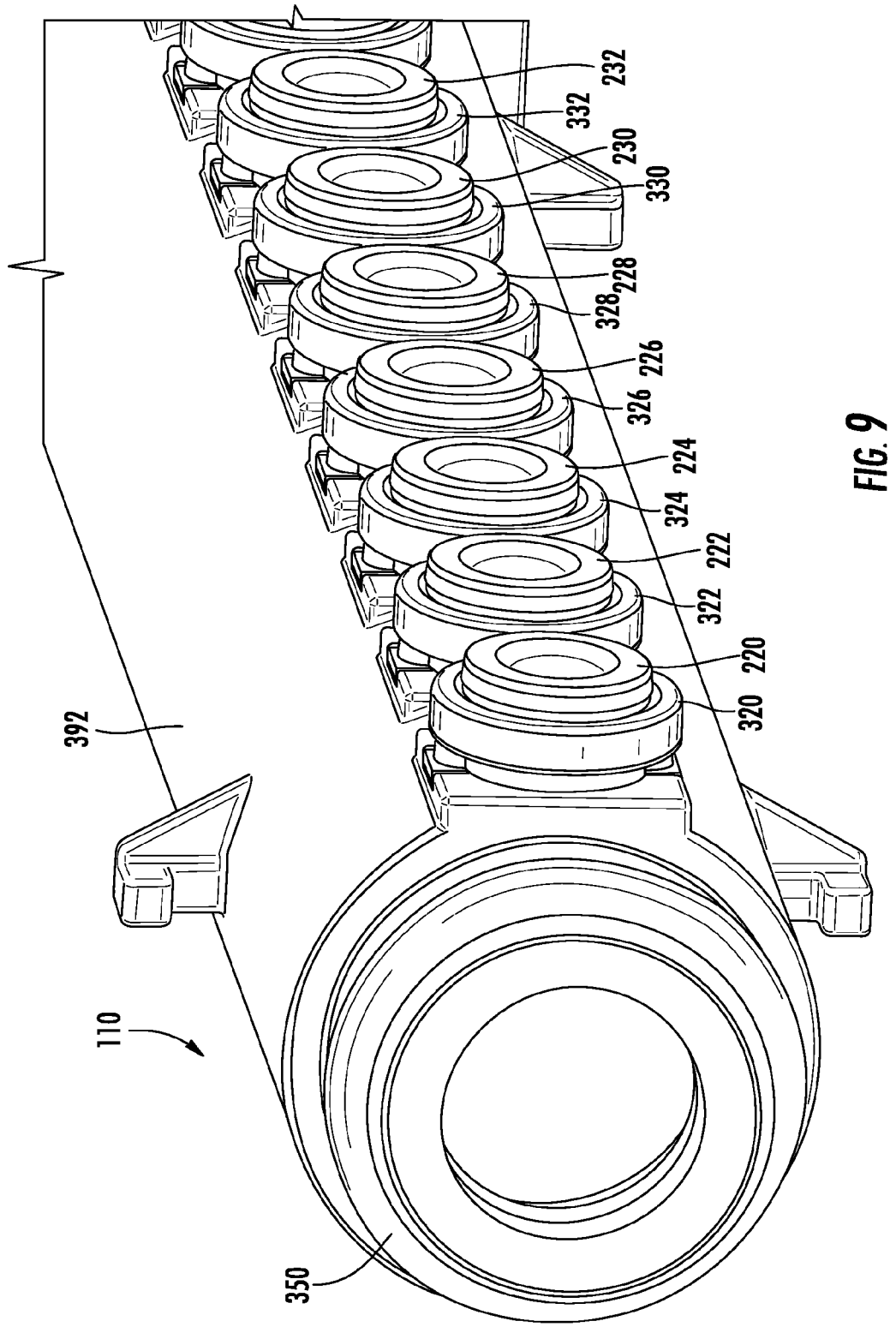
FIG. 9 is an enlarged schematic of a portion of the cooling manifold of FIG. 6.
Figure 10:
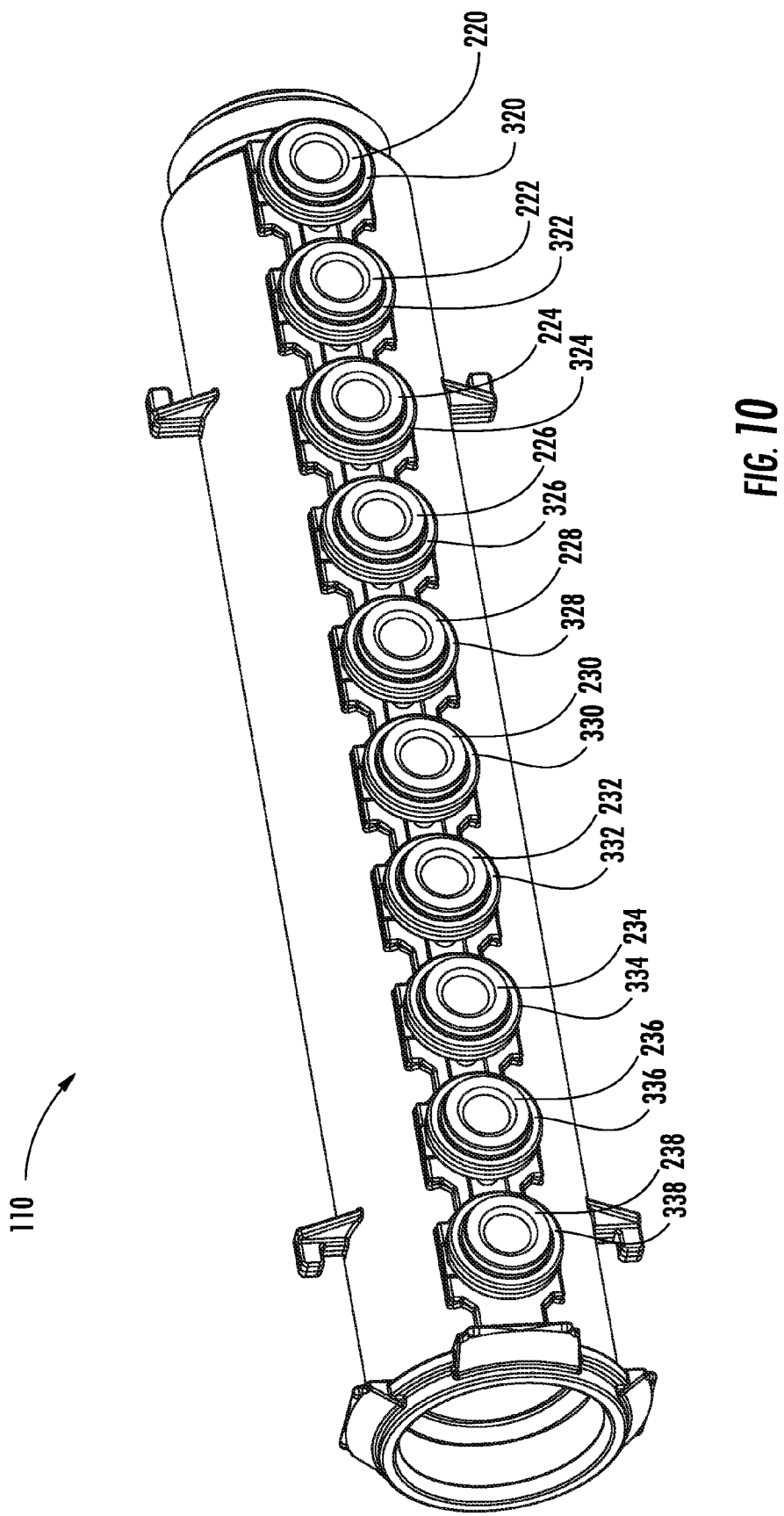
FIG. 10 is another enlarged schematic of a portion of the cooling manifold of FIG. 6.

Referring to FIGS. 6 and 7, the ring shaped members 320, 322, 324, 326, 328, 330, 332, 334, 336, 338 are configured to be disposed on the fluid ports 220, 222, 224, 226, 228, 230, 232, 234, 236, 238, respectively, to prevent each fluid port from expanding radially outwardly proximate to the respective ring shaped member when a tube from an associated heat exchanger is disposed in the fluid port to obtain an improved fluid seal between the fluid port and the heat exchanger tube.

Figure 12:
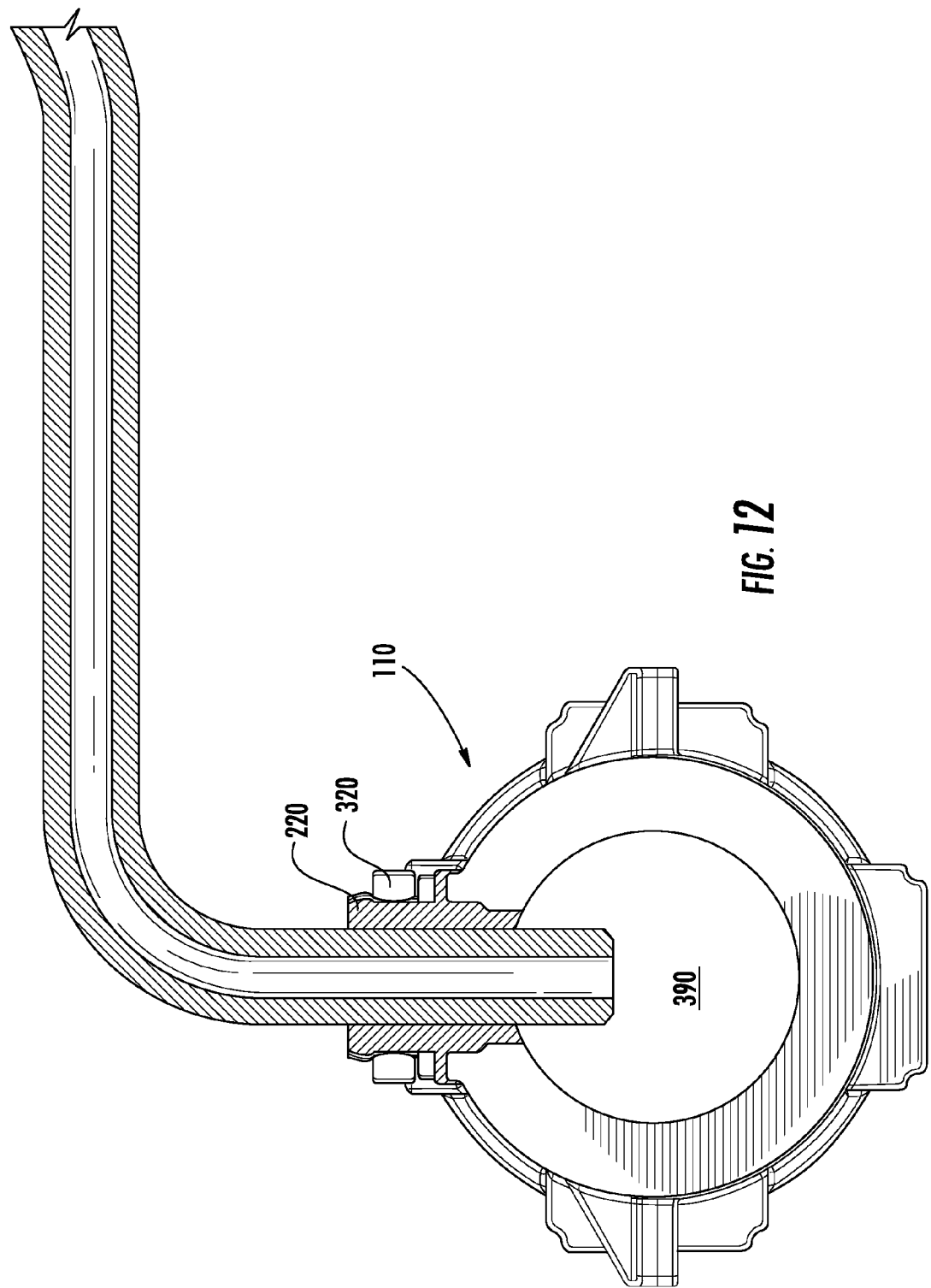
FIG. 12 is a cross-sectional schematic of the cooling manifold of FIG. 6 and a portion of a tube from a heat exchanger coupled to the cooling manifold.
Figure 13:
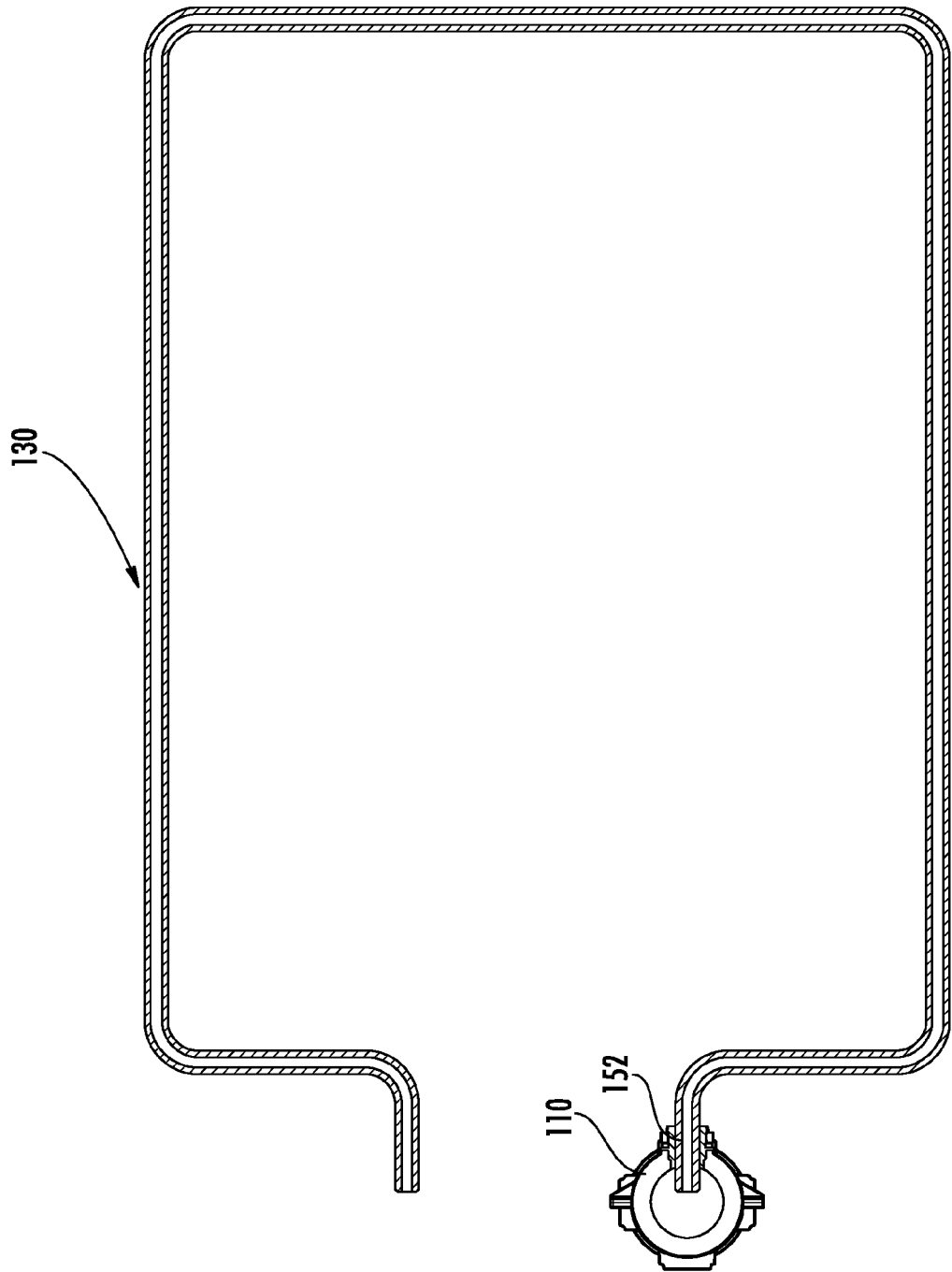
FIG. 13 is a cross-sectional schematic of the cooling manifold of FIG. 6 and of a tube from a heat exchanger coupled to the cooling manifold.

Referring to FIGS. 11 and 12, for purposes of simplicity, only the configuration of the ring shaped member 320 on the fluid port 220 will be explained in greater detail below. The ring shaped member 320 is disposed on the outer surface 462 of the tubular port body 450 a predetermined distance from the outer surface 392 of the tubular wall 200. In particular, in one exemplary embodiment, the ring shaped member 320 is disposed on the central body portion 458 in the groove 490 defined by the central body portion 458 and is disposed between the ring shaped seating portion 452 and the outer lip portion 460. An inner diameter of the ring shaped member 320 is less than an uncompressed outer diameter of the tubular port body 450 of the fluid port 220. An outer diameter of the ring shaped member 320 is greater than an outer diameter of the tubular port body 450 of the fluid port 220. The ring shaped seating portion 452 and the outer lip portion 460 assists in maintaining the position of the ring shaped member 320 in the groove 490. The ring shaped member 320 is constructed of a rigid material that prevents the tubular port body 450 from expanding radially outwardly in a region of the tubular port body 450 surrounded by the ring shaped member 320 when a tube from the heat exchanger is inserted into the tubular port body 450. As a result, the region of the tubular port body 450 surrounded by the ring shaped member 320 provides an improved fluid seal between the tubular port body 450 and the heat exchanger tube. In one exemplary embodiment, the rigid material utilized to construct the ring shaped member 320 is steel. Of course, in alternate embodiments, other materials known to those skilled in the art could be utilized to construct the ring shaped member 320.

Referring again to FIGS. 6-9, the seal 350 is disposed around the first end portion 380 of the tubular wall 200. The seal 350 is configured to provide a fluid seal between the first end portion 380 and a fluid system operably coupled to the first end portion 380 that supplies fluid through the first end portion 380 into the interior region 380.

Figure 15:
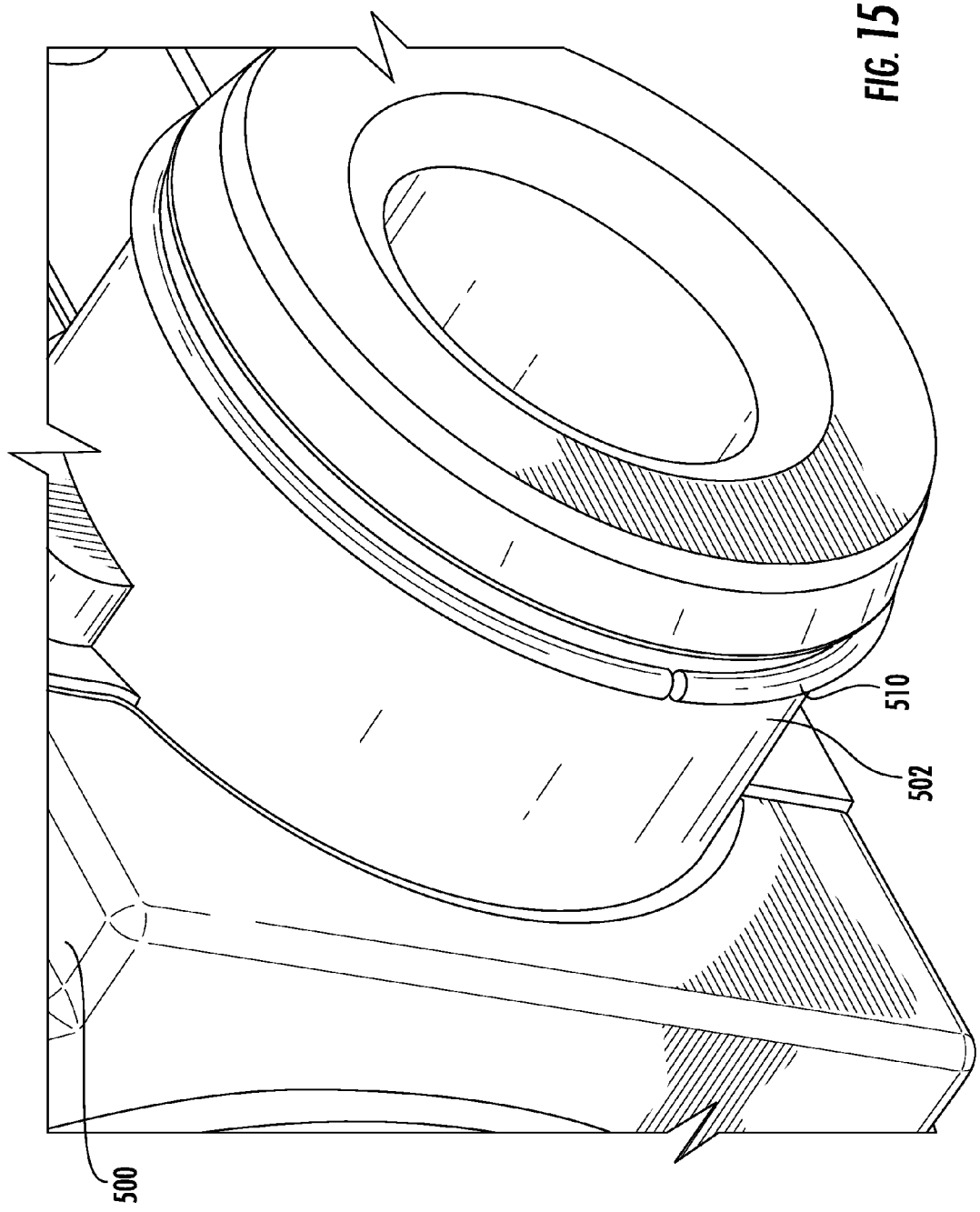
FIG. 15 is a schematic of a portion of a cooling manifold that utilizes split-ring shaped members on the fluid ports in accordance with another exemplary embodiment.
Figure 16:
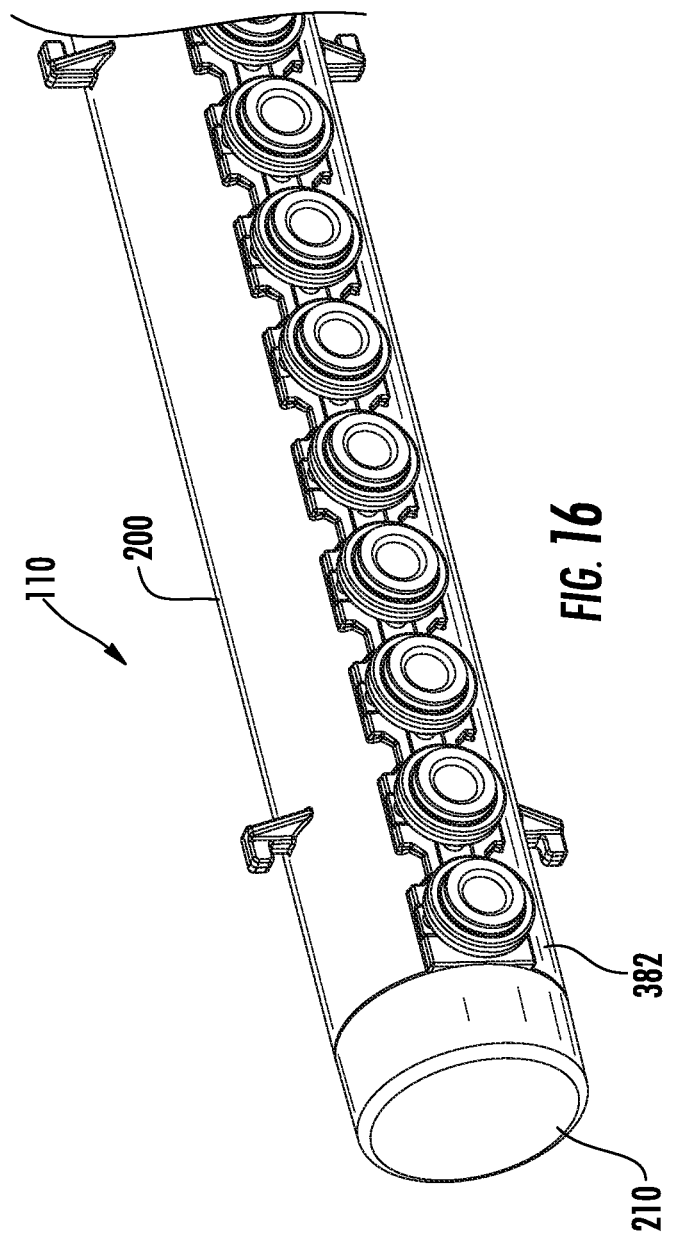
FIG. 16 is another schematic of the cooling manifold of FIG. 6 with an end cap.

Referring to FIG. 15, a portion of a cooling manifold 500 having a fluid port 502 extending therefrom is illustrated. The fluid port 502 has a split-ring shaped member 510 extending around the periphery of the fluid port 502 that prevents the fluid port 502 from expanding radially outwardly in a region of the fluid port 502 surrounded by the split-ring shaped member 510 when a tube from a respective heat exchanger is inserted into the fluid port 502. The split-ring shaped member 510 is constructed from a substantially rigid material. In one exemplary embodiment, the split-ring shaped member 510 is constructed of steel. Of course, in alternative embodiments, other materials known to those skilled in the art could be utilized to construct the split-ring shaped member 510.

The structure of the cooling manifold 500 is substantially similar to the structure of the cooling manifold 110 except that split-ring shaped members are coupled to the fluid ports, instead of the ring shaped members utilized on the cooling manifold 110.

The battery modules described herein provide a substantial advantage over other battery modules. In particular, the battery modules utilize a cooling manifold with ring shaped members or split-ring shaped members that surround portions of the fluid ports to prevent the fluid ports from expanding radially outwardly in a region of the fluid ports surrounded by the ring shaped members or the split-ring shaped members when tubes from the heat exchanger is inserted into the fluid ports. As a result, an improved fluid seal between each fluid port and each heat exchanger tube is obtained.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery module, comprising:
   a battery cell;
   a heat exchanger disposed adjacent to the battery cell, the heat exchanger having a tube;
   a cooling manifold having a tubular wall, a first elastomeric fluid port, and a ring shaped member;
   the tubular wall defining an interior region and having first and second end portions;
   the first elastomeric fluid port extending outwardly from an outer surface of the tubular wall and fluidly communicating with the interior region, the first elastomeric fluid port extending through the tubular wall and being integrally attached to the tubular wall, the first elastomeric fluid port having an aperture extending therethrough being configured and sized to receive the tube of the heat exchanger therein, the first elastomeric fluid port further having an outer elastomeric lip portion extending around an outer periphery of the first elastomeric fluid port at an end of the first elastomeric fluid port, the first elastomeric fluid port further having a groove extending into the first elastomeric fluid port that is disposed between the outer elastomeric lip portion and the tubular wall, the first elastomeric fluid port having the groove when the ring shaped member is not disposed on the first elastomeric fluid port and when the ring shaped member is disposed on the first elastomeric fluid port, the outer elastomeric lip portion having an outer diameter greater than an outer diameter of a portion of the first elastomeric fluid port defining the groove;
   the tube of the heat exchanger being disposed into the aperture of the first elastomeric fluid port and extending within the aperture past the outer elastomeric lip portion and the groove of the elastomeric fluid port; and
   the ring shaped member being disposed in the groove and being disposed on and contacting an outer surface of the first elastomeric fluid port a predetermined distance from the outer surface of the tubular wall, the ring shaped member being constructed of a rigid material having a fixed non-adjustable inner diameter that prevents the first elastomeric fluid port from expanding radially outwardly when the tube from the heat exchanger is inserted into the aperture of the first elastomeric fluid port.

2. The battery module of claim 1, wherein the ring shaped member is a unitary ring shaped member and has an inner diameter that is less than an uncompressed outer diameter of a tubular port body of the first elastomeric fluid port.

3. The battery module of claim 1, wherein the ring shaped member is constructed of the rigid material, and the tubular wall is constructed of plastic.

4. The battery module of claim 3, wherein the first elastomeric fluid port is constructed of a thermoplastic elastomer.

5. The battery module of claim 4, wherein the rigid material comprises steel.

6. The battery module of claim 1, wherein an outer diameter of the ring shaped member is greater than an outer diameter of a tubular port body of the first fluid port.

7. The battery module of claim 1, further comprising a plurality of additional elastomeric fluid ports extending outwardly from the outer surface of the tubular wall and fluidly communicating with the interior region, the plurality of additional elastomeric fluid ports being disposed linearly along the outer surface and spaced apart from one another, the plurality of additional elastomeric fluid ports having a structure identical to a structure of the first elastomeric fluid port.

8. A battery module, comprising:
a battery cell;
a heat exchanger disposed adjacent to the battery cell, the heat exchanger having a tube;
a cooling manifold having a tubular wall, a first fluid port, and a split-ring shaped member;
the tubular wall defining an interior region and having first and second end portions;
the first elastomeric fluid port extending outwardly from an outer surface of the tubular wall and fluidly communicating with the interior region, the first elastomeric fluid port extending through the tubular wall and being integrally attached to the tubular wall, the first elastomeric fluid port having an aperture extending therethrough being configured and sized to receive the tube of the heat exchanger therein, the first elastomeric fluid port further having an outer elastomeric lip portion extending around an outer periphery of the first elastomeric fluid port at an end of the first elastomeric fluid port, the first elastomeric fluid port further having a groove extending into the first elastomeric fluid port that is disposed between the outer elastomeric lip portion and the tubular wall, the first elastomeric fluid port having the groove when the ring shaped member is not disposed on the first elastomeric fluid port and when the ring shaped member is disposed on the first elastomeric fluid port, the outer elastomeric lip portion having an outer diameter greater than an outer diameter of a portion of the first elastomeric fluid port defining the groove;
the tube of the heat exchanger being disposed into the aperture of the first elastomeric fluid port and extending within the aperture past the outer elastomeric lip portion and the groove of the elastomeric fluid port; and
the split-ring shaped member having a gap between first and second ends of the split-ring shaped member, the split-ring shaped member being disposed in the groove and being disposed on and contacting an outer surface of the first elastomeric fluid port a predetermined distance from the outer surface of the tubular wall, the split-ring shaped member being constructed of a rigid material that prevents the first elastomeric fluid port from expanding radially outwardly when a tube from the heat exchanger is inserted into the aperture of the first elastomeric fluid port, the split-ring shaped member being a ring-shaped member with an opening therein.

9. The battery module of claim 8, wherein the split-ring shaped member is a unitary split-ring shaped member that extends at least 270 degrees around the outer surface of the first elastomeric fluid port, the split-ring shaped member having an inner diameter that is less than an uncompressed outer diameter of a tubular port body of the first elastomeric fluid port.

10. The battery module of claim 8, wherein the split-ring shaped member is constructed of the rigid material, and the tubular wall is constructed of plastic.

11. The battery module of claim 10, wherein the first elastomeric port is constructed of a thermoplastic elastomer.

12. The battery module of claim 11, wherein the rigid material comprises steel.

13. The battery module of claim 8, wherein an outer diameter of the split-ring shaped member is greater than an outer diameter of a tubular port body of the first elastomeric fluid port.

14. The battery module of claim 8, further comprising a plurality of additional elastomeric fluid ports extending outwardly from the outer surface of the tubular wall and fluidly communicating with the interior region, the plurality of additional elastomeric fluid ports being disposed linearly along the outer surface and spaced apart from one another, the plurality of additional elastomeric fluid ports having a structure identical to a structure of the first elastomeric fluid port.

15. The battery module of claim 1, wherein the first elastomeric fluid port further includes a tubular port body; the tubular port body having a coupling body portion, a central body portion, and the outer elastomeric lip portion; the coupling body portion being configured to extend through the tubular wall of the cooling manifold and being attached to the tubular wall, the central body portion extending from the coupling body portion and is further coupled to the outer elastomeric lip portion.

16. The battery module of claim 15, wherein the first elastomeric fluid port further includes a ring shaped seating portion, the ring shaped seating portion extending outwardly from the central body portion and extending around an outer periphery of the central body portion.

17. The battery module of claim 16, wherein the central body portion defines the groove thereon that is disposed between the ring shaped seating portion and the outer elastomeric lip portion, the ring shaped member being disposed on and contacting the outer surface of the first elastomeric fluid port within the groove.

18. The battery module of claim 15, wherein the central body portion defines the groove thereon disposed between the outer surface of the tubular wall of the cooling manifold and the outer elastomeric lip portion, the ring shaped member being disposed on and contacting the outer surface of the first elastomeric fluid port within the groove.

19. The battery module of claim 18, wherein the outer elastomeric lip portion has the outer diameter greater than an outer diameter of the central body portion.

20. A battery module, comprising:
a battery cell;
a heat exchanger disposed adjacent to the battery cell, the heat exchanger having a tube;
a cooling manifold having a plastic tubular wall, a first elastomeric fluid port, and a ring shaped member;
the plastic tubular wall defining an interior region and having first and second end portions;
the first elastomeric fluid port having a tubular port body and a ring shaped seating portion;
the tubular elastomeric port body being coupled to the plastic tubular wall and extending through the plastic tubular wall and outwardly from the plastic tubular wall, the tubular elastomeric port body fluidly communicating with the interior region, the tubular elastomeric port body having an aperture extending therethrough being configured and sized to receive the tube of the heat exchanger therein, the tubular elastomeric port body further having an outer elastomeric lip portion extending around an outer periphery of the tubular elastomeric port body proximate to an end of the tubular port body, the tubular elastomeric port body further having a groove extending into the tubular elastomeric port body that is disposed between the outer elastomeric lip portion and the plastic tubular wall, the tubular elastomeric port body having the groove when the ring shaped member is not disposed on the tubular elastomeric port body and when the ring shaped member is disposed on the tubular elastomeric port body, the outer elastomeric lip portion having an outer diameter greater than an outer diameter of a portion of the tubular elastomeric port body defining the groove;
the tube of the heat exchanger being disposed into the aperture of the tubular elastomeric port body and extending within the aperture past the outer elastomeric lip portion and the groove of the tubular elastomeric port body;

the ring shaped seating portion extending around an outer periphery of the tubular elastomeric port body and being disposed between the plastic tubular wall and the groove, an outer diameter of the ring shaped seating portion being greater than an outer diameter of the outer elastomeric lip portion;

the ring shaped member being disposed in the groove and being disposed on and contacting an outer surface of the tubular elastomeric port body proximate to the ring shaped seating portion, the ring shaped member being constructed of a rigid material having a fixed non-adjustable inner diameter that prevents the tubular elastomeric port body from expanding radially outwardly when the tube from the heat exchanger is inserted into the aperture of the tubular elastomeric port body.

21. The battery module of claim 20, wherein the ring shaped member is a unitary ring shaped member.

22. The battery module of claim 20, wherein the tubular elastomeric port body has the outer elastomeric lip portion when the ring shaped member is not disposed on the tubular elastomeric port body and when the ring shaped member is disposed on the tubular elastomeric port body.

* * * * *